United States Patent [19]
Henze

[11] Patent Number: 4,953,068
[45] Date of Patent: Aug. 28, 1990

[54] FULL BRIDGE POWER CONVERTER WITH MULTIPLE ZERO VOLTAGE RESONANT TRANSITION SWITCHING

[75] Inventor: Christopher P. Henze, Lakeville, Minn.

[73] Assignee: Unisys Corporation, Blue Bell, Pa.

[21] Appl. No.: 433,299

[22] Filed: Nov. 8, 1989

[51] Int. Cl.$^5$ .......................................... H02M 3/335
[52] U.S. Cl. ........................................ 363/17; 363/98; 363/127
[58] Field of Search ...................... 363/17, 41, 97, 98, 363/127, 132

[56] References Cited

U.S. PATENT DOCUMENTS

| | | | |
|---|---|---|---|
| 3,487,289 | 12/1969 | McMurray | 363/161 |
| 4,186,437 | 1/1980 | Cuk | 363/65 |
| 4,399,499 | 8/1983 | Butcher et al. | 363/98 |
| 4,618,919 | 10/1986 | Martin, Jr. | 363/21 |
| 4,663,699 | 5/1987 | Wilkinson | 363/17 |
| 4,672,303 | 6/1987 | Newton | 323/285 |
| 4,720,668 | 1/1988 | Lee et al. | 323/271 |
| 4,727,308 | 2/1988 | Huljak et al. | 323/222 |
| 4,742,441 | 5/1988 | Akerson | 363/127 |
| 4,814,962 | 3/1989 | Magalhaes et al. | 363/17 |

OTHER PUBLICATIONS

Liu, K., Lee, F. C., "Resonant Switches-A Unified Approach to Improve Performance of Switching Converters", IEEE INTEEC Proceedings, pp. 344–351, 1984.

Liu, K. H., Lee, F. C., "Zero-Voltage Switching Technique in DC-DC Converters," IEEE PESC Record, pp. 58-70, 1986.

Goldfarb, R., "A New Non-Dissipative Load-Line Shaping Technique Eliminates Switching Stress in Bridge Converters," Proceedings of Powercon 8, paper D-4, 1981.

Undeland, T. M., "Snubbers for Pulse Width Modulated Bridge Converters with Power Transistors or GTOs," IEEE IPEC Record, pp. 313-323, 1983.

Severns, R. P., Bloom, G., "Modern DC-to-DC Switchmode Power Converter Circuits," Van Nostrand Reinhold, New York, pp. 19-23, 1985.

Middlebrook, R. D., Cuk, S., "A General Unified Approach to Modeling Switching-Converter Power Stages," Advances in Switched Mode Power Conversion, vol. I & II, Teslaco, pp. 73-89, 1983.

Henze, C. P., Mohan, N., "Modeling and Implementation of a Digitally Controlled Power Converter Using Duty Ratio Quantization," IEEE/ESA PESC Record, ESA Proceedings, pp. 245-255, 1985.

Fragale, W., Pelly, B., Smith, B., "The HEXFET's Integral Reverse Rectifier-a 'Hidden' Bonus for the Circuit Designer," Power Conversion International, Mar.-Apr. 1980, pp. 17-36.

Henze, C. P., Martin, H. C., Parsley, D. W., "Zero-Voltage Switching in High Frequency Power Converters Using Pulse Width Modulation," APEC Record, Feb. 1-5, 1988.

Lo, D. S., Henze, C. P., "Development of a DC-to DC Power Converter for Distributed Power Processing," APEC Conference, Mar. 13-19, 1989.

Fisher, R. A., Ngo, K. D. T., Kuo, M. H., "A 500 kHZ, 250 W DC-DC Converter with Multiple Outputs Controlled by Phase-Shifted PWM and Magnetic Amplifiers," HFPC, May 1988 Proceedings, pp. 100-110.

Mweene, L. H., Wright, C. A., Schlecht, M. F., "A 1 kW, 500 kHz Front-End Converter for a Distributed Power Supply System," IEEE, 1989, pp. 423-432.

Middlebrook, R. D., "Generalized Theory of Switching DC-to-DC Converters," *Advances in Switched-Mode Power Conversion*, Teslaco, 1983, pp. 35-43 (see specifically p. 38).

Primary Examiner—Peter S. Wong
Attorney, Agent, or Firm—Glenn W. Bowen; Robert S. Bramson

[57] ABSTRACT

A full bridge switching power converter employs zero-voltage, resonant-transition (ZVRT) switching techniques which appreciably reduces the switching losses at high switching frequencies, (for example, 1 MHz and above), using constant frequency, pulse-width-modulation techniques. The converter is implemented using a transfer with four switching FET's coupled to the primary of the transformer and four switching FET's coupled to the output of the transformer and a control unit that supplies the constant waveforms necessary to achieve synchronization and timing required to achieve the ZVRT switching.

2 Claims, 6 Drawing Sheets

CIRCUIT OPERATION PRIOR TO
TIME INSTANT $t_a$.

Fig. 5

CIRCUIT OPERATION BETWEEN
TIME INSTANTS $t_a$ AND $t_b$.

Fig. 6

CIRCUIT OPERATION BETWEEN
TIME INSTANTS $t_b$ AND $t_c$.

Fig. 7

CIRCUIT OPERATION BETWEEN
TIME INSTANTS $t_c$ AND $t_d$.

Fig. 8

CIRCUIT OPERATION BETWEEN
TIME INSTANTS $t_d$ AND $t_e$.

Fig. 9

FULL BRIDGE MULTIPLE ZVRT
SWITCHING TOPOLOGY OPERATES
WITH A TWO QUADRANT OUTPUT
CAPACITY.

*Fig. 10*

OUTPUT INDUCTOR CURRENT $t_L$
SHIFTS WITH THE POLARITY OF
THE LOAD CURRENT.

*Fig. 11*

FULL BRIDGE POWER CONVERTER WITH MULTIPLE ZERO VOLTAGE RESONANT TRANSITION SWITCHING

BACKGROUND OF THE INVENTION

The present invention relates DC to DC power converters for converting an input voltage and current to a different output voltage and current. In particular, the invention relates to switching power converters of the full bridge type which in the past have completed transitions from one switched state to another by means of dissipatively forced commutation.

Switched regulator DC to DC converter circuits are highly efficient. Examples of these include such converter topologies as the buck, (or step-down) the boost, (or step-up), and the buck-boost (or flyback), which may be used either for step-up or step-down voltage regulation.

All of these converters include at least one switching device, such as a bipolar transistor, and a regulating means, such as a semiconductor diode. In these switching regulator circuits, the storage inductor and the capacitor account for a major part of the regulator's cost and its electrical losses. In addition to these losses there are losses due to capacitance of the switching transistor. For example, if an FET is employed there are losses incurred as a result of charging and discharging the drain-source capacitance and also the gate-source capacitance. In addition, there are capacitance losses in the rectifier which may consist of a separate diode, or which may be implemented as an integral part of the FET.

Additional losses are created by the diode reverse recovery losses and FET losses due to finite transition times during switching. It is desirable to reduce all of these losses to a minimum. In particular, it is advantageous to eliminate the capacitive losses of the switching transistor and the rectifier, which occur during the transition from one switched state to another, due to dissipatively forced commutation in conventional power converters.

Since frequency modulation is used to control the output characteristics of a resonant converter, new techniques and methods must be developed for feedback control and stability analysis of such converters; furthermore, input and output filter design is more complex with resonant converters. Because internal waveforms have large sinusoidal components, the off-state voltage stress on semiconductor devices is increased and the conduction losses in both active and passive components are increased.

Various versions of resonant-transition, zero-voltage switching power converters are known which draw the energy required to charge the various switching transistor and rectifier capacitances from lossless reactive energy sources. For the buck, boost, buck-boost and certain combinations/extensions of these converters, this can be accomplished by placing a rectifier across the switching transistor, and then placing a second switching transistor across the diode rectifier. These transistors are then controlled by separate clock phases so that bipolar current flow is obtained over the complete range of the power converter from no load to full load. The current in the inductor in such a device always has a negative component, as well as a positive component, during each switching cycle from no load to full load. This results in the capacitance of the switching transistors and rectifiers of the circuit being reactively, rather than dissipatively, commutated.

While separate field effect transistors and diode rectifiers may be employed, it is also possible to employ field-effect transistors (FET's) or HEXFET's which have integral reverse rectifiers built into them. This HEXFET type of device is described in the article entitled "The HEXFET's Integral Reverse Rectifier—a 'Hidden' Bonus for the Circuit Designer" by W. Fragale, B. Pelly and B Smith in Power Conversion International, March-April 1980, pages 17-36.

U.S. Pat. No. 4,186,437, issued Jan. 29, 1980, entitled "Push-Pull Switching Power Amplifier" to Slobodan M. Cuk described a converter which is generally known as a Cuk converter, which had a specific configuration that allowed for bidirectional power flow to obtain high efficiency, small size, and low weight. In addition, with this design there was reduced pulsation of both input and output currents and elimination of the switching ripple in the output. This converter, while utilizing bidirectional power flow, however, drew inductor currents which were only of a single polarity during a switching cycle.

Non-dissipative snubbing networks are known in which the load is inductive during turn-on of a power converter switch, and is capacitive during turn-off. the article entitled "A New Non-Dissipative Load-Line Shaping Technique Eliminates Switching Stress in Bridge Converters" by Ron Goldfarb in IEEE Proceedings on Powercon 8, D-4, pages 1-6 describes a buck-type, full bridge configuration which describes the use of such a snubbing circuit. The technique described in the converter of this article depends on using the magnetizing current of the output transformer to recover the charge on the snubbing capacitors. Current steering is accomplished by Goldfarb by independently controlling the conduction time of the power transistors. Four switching transistors, a diode bridge, a snubber circuit, a snubber reset sense circuit and a pulse steering logic circuit are employed.

Other patents and articles dealing with the reduction of losses in power converters are found in the following:

K. H. Liu and F. C. Lee, "Resonant Switches—A Unified approach to Improve Performance of Switching Converters," IEEE INTELEC Proceedings; pp. 344-351, 1984.

K. H. Liu and F. C. Lee, "Zero-Voltage Switching Technique in DC-DC Converters," IEEE PESC Record; pp. 58-70, 1986.

R. Goldfarb, "A New Non-dissipative Load-Line Shaping Technique Eliminates Switching Stress in Bridge Converters," Proceedings of Powercon 8, paper D-4, 1981.

T. M. Undeland, "Snubbers for Pulse Width Modulated Bridge Converters with Power Transistors or GTOs," IEEE IPEC Record, pp. 313-323, 1983.

R. P. Severns and G. Bloom, "Modern DC-to-DC Switchmode Power converter Circuits," Van Nostrand Reinhold, New York, pp. 19-23, 1985.

H. C. Martin, "Miniature Power Supply Topology for Low Voltage Low Ripple Requirements," U.S. Pat. No. 4,618,919.

R. D. Middlebrook and S. Cuk, "A General Unified Approach to Modeling Switching-Converter Power States," Advances in Switched Mode Power Conversion, Vol. I&II, Teslaco, pp. 73-89, 1983.

C. P. Henze and N. Mohan, "Modeling and Implementation of a Digitally Controlled Power Converter Using Duty Ratio Quantization," IEEE/ESA PESC Record, ESA Proceedings, pp. 245-255, 1985.

U.S. Pat. No. 4,672,303 in the name of Stephen F. Newton, issued June 9, 1987.

U.S. Pat. No. 4,720,668 in the names of Fred C. Lee and Kwang-Hwa Liu, issued Jan. 19, 1988.

SUMMARY OF THE INVENTION

Zero voltage, resonant transition (ZVRT) switching techniques are employed to provide a full bridge, high frequency (for example, 1 MHz and above) switching power converter that has substantially reduced switching power losses. The circuit uses a pulse transformer that has a primary and a secondary winding, two input lines and two output lines. Eight field-effect transistors are used so that the current path of each one is coupled between one of the transformer windings and one of either the input or output lines. A cyclic pattern of control pulses are supplied by a control unit to the gate terminals of the FET's. These pulses employ pulse-width-modulation to open and close the current paths of the FET's so that a tri-state input voltage that cyclically steps between a positive voltage level, to zero voltage level, to a negative voltage level, to a zero voltage level and back to the positive voltage level provides the energy used to supply the output power. The FET's are preferably constructed with an internal diode and capacitance that are coupled across the source/drain current path of the FET. External diode and capacitance may be coupled across the FET, if desired. The diodes are placed to provide rectification in the direction required to achieve zero-voltage, reactive transition and thereby substantially reduce switching losses in a full bridge power converter.

BRIEF DESCRIPTION OF THE DRAWINGS

The present invention is described by reference to the drawings in which.

TECHNICAL DESCRIPTION OF THE INVENTION

As noted previously, power converters using zero voltage, resonant-transition (ZVRT) have been developed. Zero voltage, resonant-transition switching allows otherwise conventional power converter topologies to operate at high switching frequencies (for example, 1 MHz and above) using constant frequency, pulse-width-modulation techniques. Efficient operation is obtained because the large switching losses associated with high frequency switching are greatly reduced in the high voltage power transistors. The present invention provides a power converter which operates with ZVRT switching in both the primary side input power switching transistors and the secondary side output synchronous rectifiers. Furthermore, secondary side synchronous rectifier field-effect transistors (FETs) are driven with overlapping control waveforms to reduce conduction losses in the primary and secondary side FETs and in the power transformer.

Figure 1:
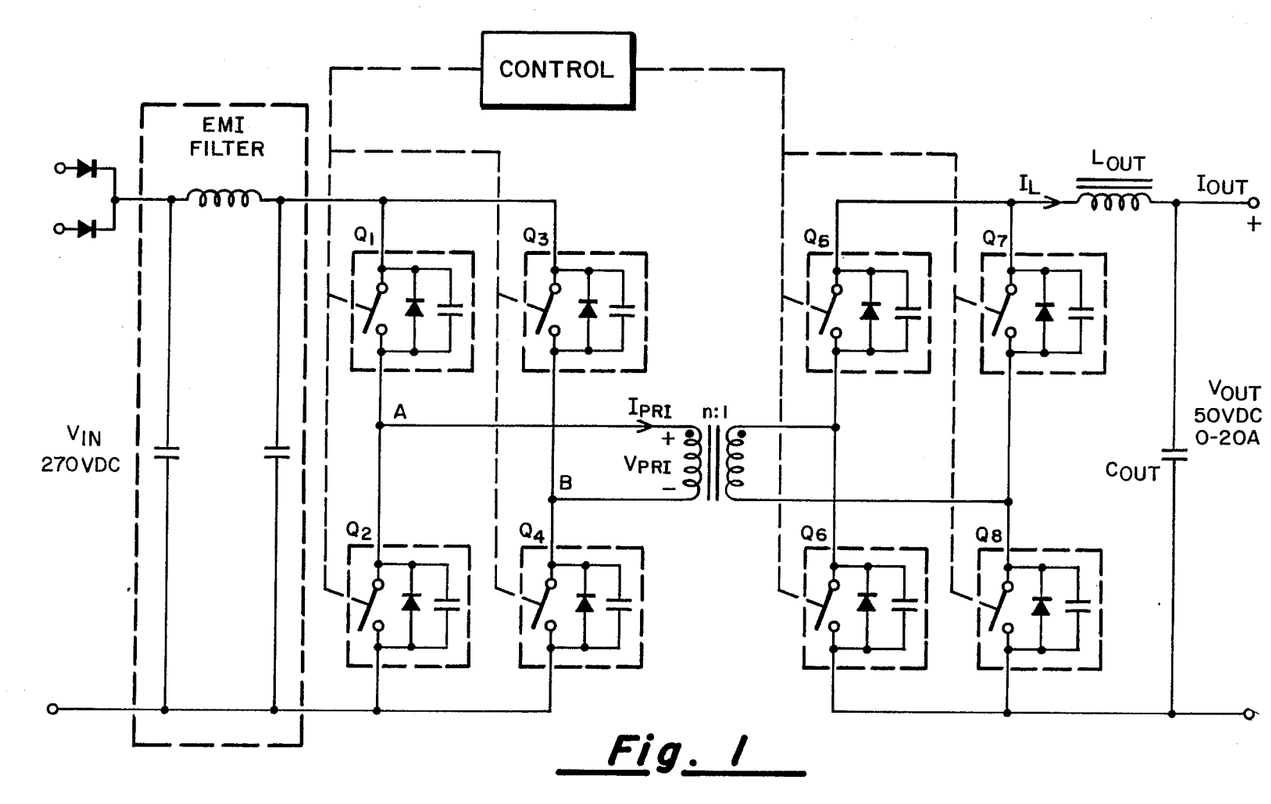
FIG. 1 is a schematic drawing of circuit implementation of the invention.
Figure 2:
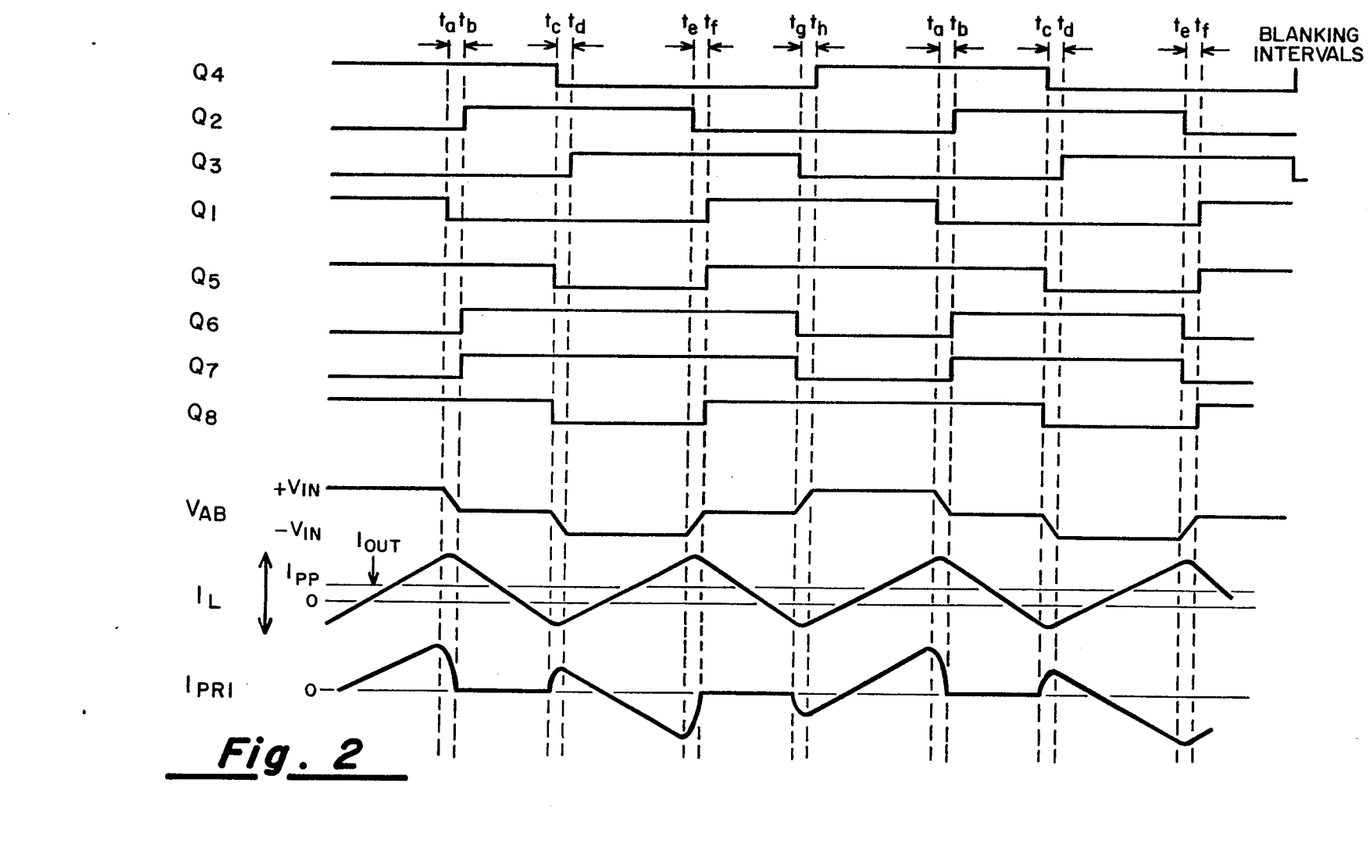
FIG. 2 is a timing chart that shows control signals and voltage and waveforms for the circuit of FIG. 1.

The full bridge multiple ZVRT converter, shown in FIG. 1, uses four field effect transistors (FETs) in a full H-bridge arrangement for both primary side and secondary side power switching. Typical control and circuit waveforms are shown in FIG. 2. The primary side FETs are driven at a constant frequency using phase-shifted, pulse-width-modulated (PWM) control. The FETs are driven at 500 KHz which results in an output ripple frequency of approximately 1 MHz. Precisely controlled blanking intervals are generated by the digital power converter controller to implement the ZVRT switching. Furthermore, control waveforms to provide precisely controlled overlapping conduction in the synchronous rectifiers are also generated by the digital power converter controller.

A full bridge multiple ZVRT switching converter is very well suited for a front end converter for a high density distributed power system. The advantages of this topology are summarized below and explained in detail throughout this section.

1. Zero voltage switching is implemented for all FETs allowing efficient high frequency operation.
2. Synchronous rectification increases efficiently since diode offset losses and reverse recovery losses are eliminated.
3. Overlapping conduction of the synchronous rectifiers further increases efficiency because ripple currents are reduced in the FETs and power transformer.
4. The full bridge phase shifted front end allows for a wide input voltage range.
5. A simple winding structure may be used for the power transformer increasing copper and core utilization and requiring minimized leakage inductance rather than controlled leakage inductance.
6. The converter inherently may operate with a two quadrant output capability. This will allow the converter to absorb power reflections from the load and to operate without performance degradation at zero load current.

7. Resonant transition switching provides reduced electro-magnetic interference (EMI).
8. A common power FET hybrid design may be used for both the primary side and secondary side H-bridges reducing development and manufacturing costs.

Figure 3:
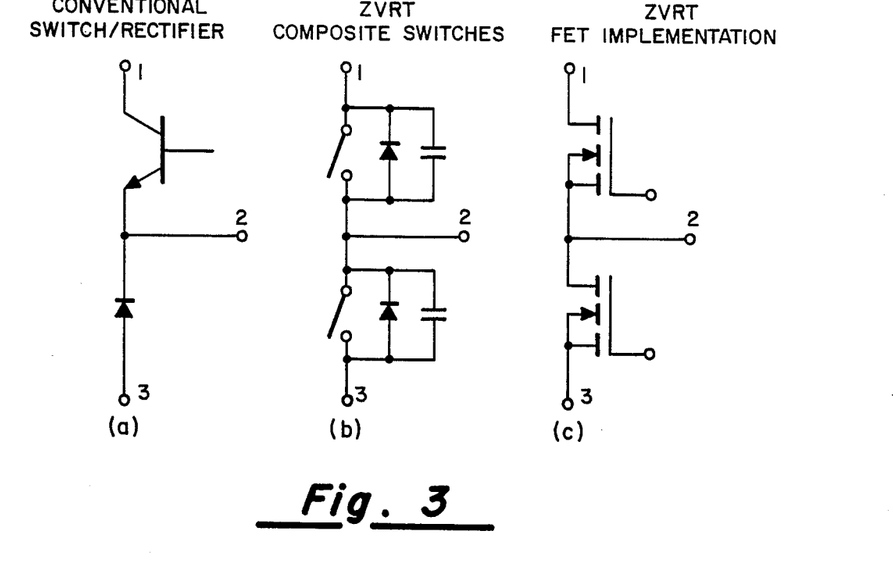
FIGS. 3a, 3b and 3c, respectively, are schematic illustrations of a conventional switch/rectifier, a composite switch as illustrated in FIG. 1 and an FET implementation of such a composite switch.
Figure 4:
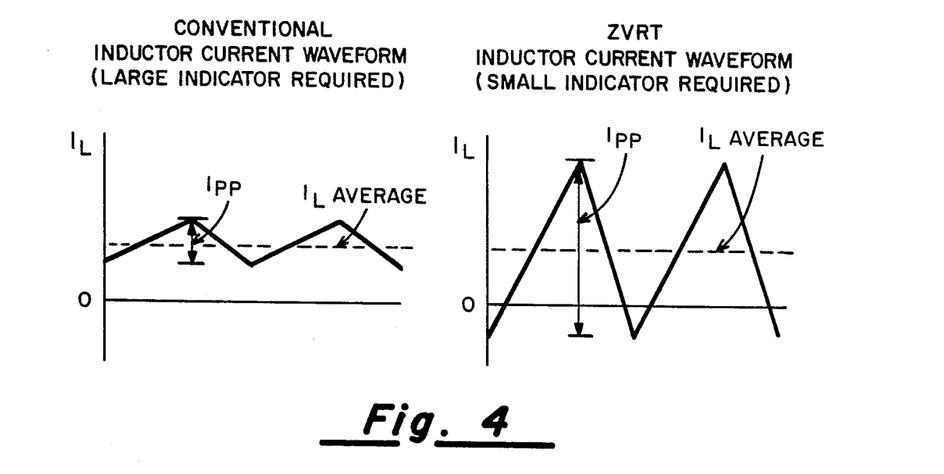
FIG. 4a is a waveform graph of the output inductor current when a relatively large inductor is employed in the circuit of FIG. 1.
FIG. 4b is a waveform graph of the output inductor current when a relatively small inductor is employed in the circuit of FIG. 1.

It is known that ZVRT switching can be implemented in conventional buck, boost, and buck-boost topologies with three modifications. First, conventional power switching transistor and diode of FIG. 3a must both be replaced by the composite switch of FIG. 3b which is functionally identical to the modern power FET of FIG. 3c. Second, the inductance value must be reduced to increase the peak-to-peak AC ripple current such that the minimum excursion in the inductor current waveform will reach a negative value for all load currents of interest, as shown in FIG. 4. Third, a small but finite blanking interval is provided in the switch control waveform during which both switches will be in the off state simultaneously.

When these three modifications are introduced to an otherwise conventional buck, boost or buck-boost circuit, resonant transition switching will occur. During the blanking interval, the energy in the inductor resonates with the switch capacitances to drive the voltage from rail to rail allowing the switches to be turned off and on at zero voltage. The polarity of the inductor current must reverse for each subsequent switching transition to drive the switch capacitances in the proper direction.

ZVRT topologies operate at a constant switching frequency as opposed to resonant switch topologies which operate at a variable frequency. The small signal model of a ZVRT converter is substantially identical to the small signal model of the conventional converter from which it was derived.

Figure 5:
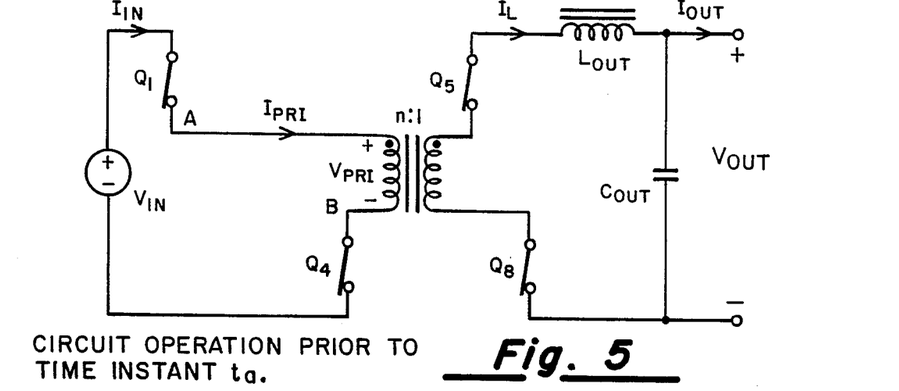
FIG. 5 is a simplified operational schematic illustration of the circuit of FIG. 1 at a time prior to the first $t_a$ of FIG. 2.

In the waveform diagrams of FIG. 2 it is assumed that the full bridge multiple ZVRT switching converter is operating in a steady state. The waveforms of FIG. 2 are generated by the control unit, CU, and are supplied to the gate terminals G, of the FET's Q1–Q8. Prior to time instant $t_a$ transistors Q1, Q4, Q5 and Q8 are conducted through their source, S, to Drain, D, paths, as shown in FIG. 5. The voltage across the primary winding of the power transformer is equal to the input voltage $V_{in}$, which causes the current $I_L$ in the output inductor $I_{out}$ to increase. At time instant $t_a$ transistor or Q1 is turned off at zero voltage because the capacitance at node A prevents an instantaneous voltage change across transistor Q1.

Figure 6:
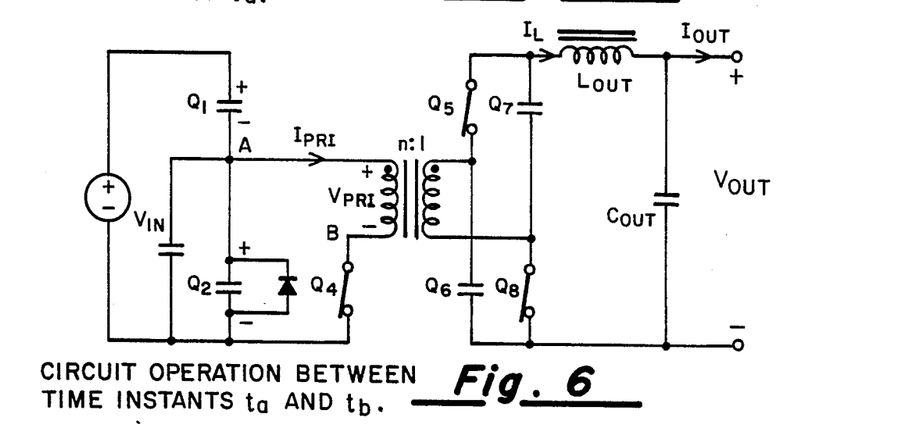
FIG. 6 is a simplified operational schematic illustration of the circuit of FIG. 1 at the time between the times $t_a$ and $t_b$ of FIG. 2.

During the blanking interval in the drive waveforms (i.e., from time instants $t_a$ to $t_b$), the output inductor $L_{out}$ forces the primary current which is essentially constant to discharge the capacitance at node A, as shown in FIG. 6. The capacitance at node A is made up of the device capacitances of Q1 and Q2, the reflected device capacitances of Q6 and Q7, and other parasitic capacitances, such as the primary winding self capacitance. When the voltage at node A reaches zero, the antiparallel diode of Q2 will become forward biased and clamp the voltage to zero. At time instant $t_b$ transistors Q2, Q6 and Q7 are turned on at zero voltage.

Figure 7:
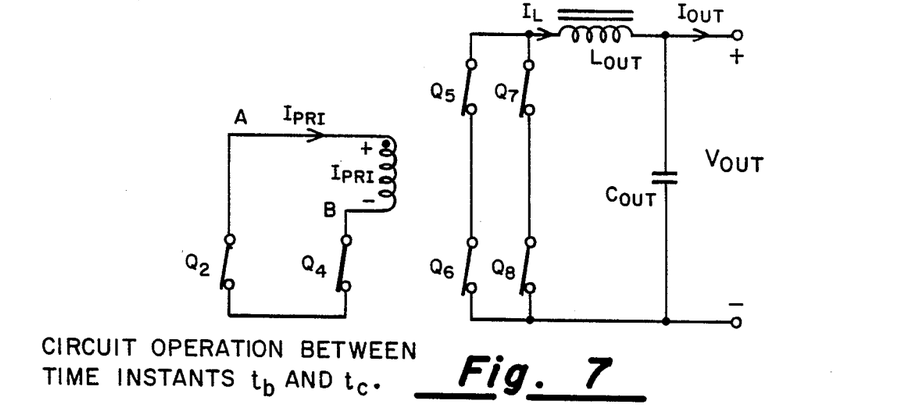
FIG. 7 is a simplified operational schematic illustration of the circuit of FIG. 1 at a time between the times $t_b$ and $t_c$ of FIG. 2.

During the time interval between instants $t_b$ and $t_c$ all four output rectifier transistors are turned on, as shown in FIG. 7. A voltage equal to $-V_{out}$ is applied across the output inductor $L_{out}$ causing the current in the inductor $I_L$ to decrease to a negative value. During this time the rectifiers force a short circuit across the secondary of the power transformer. This prevents the inductor current from circulating on the primary side of transformer through Q2 and Q4 eliminating unnecessary conduction losses. The presence of these conduction losses has been noted as a disadvantage of the phase shifted full bridge converter when a controlled magnetizing inductance in the power transformer is utilized for zero voltage switching rather than the output inductor as in the full bridge multiple ZVRT switching converter of the present invention on Q5–Q8. The forced short circuit also provides a path for reset current in the power transformer preventing transformer saturation and eliminating the need for a primary side DC-blocking capacitor. Conduction losses in the output rectifier transistors are also reduced because two parallel paths are formed to share the inductor current.

Figure 8:
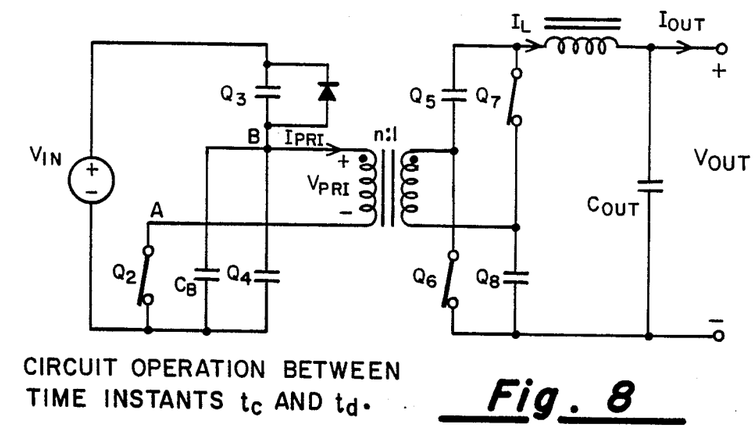
FIG. 8 is a simplified operational schematic illustration of the circuit of FIG. 1 at a time between the times $t_c$ and $t_d$ of FIG. 2.

At time $t_c$ transistors Q4, Q5 and Q8 are turned off. The turn off of these transistors occurs at zero voltage because the self capacitance of the devices insures that the voltage remains constant at the turn off instant. The inductor current $I_L$ which is now negative charges the capacitance at node B during the time interval between instants $t_c$ and $t_d$, as shown in FIG. 8. This causes the voltage at node B to increase until the antiparallel internal diode of transistor Q3 becomes forward biased and clamps node B to the input voltage rail at which point the voltage across the primary winding of the power transformer is equal to $-V_{in}$. The capacitance at node B is made up of the device capacitances of transistors Q3 and Q4, the reflected device capacitances of transistors Q5 and Q8, and other parasitic capacitances, such as the primary winding self winding capacitance.

Figure 9:
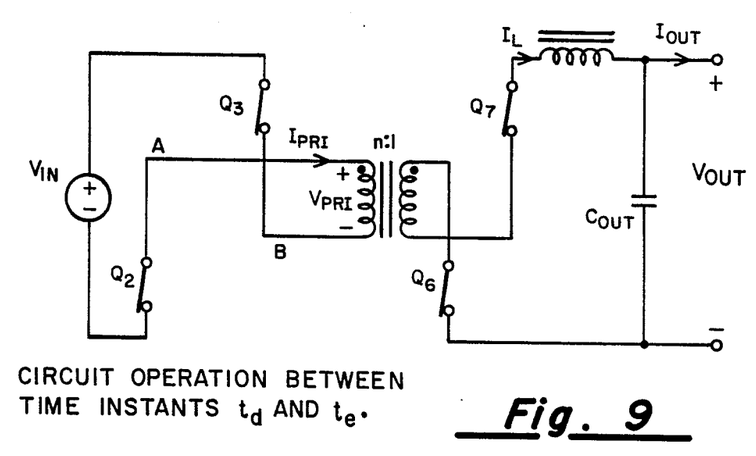
FIG. 9 is a simplified operational schematic illustration of the circuit of FIG. 1 at a time between the times $t_d$ and $t_e$ of FIG. 2.

At time instant $t_d$ transistor Q3 is turned on at zero voltage. Zero voltage turn on is insured because the inductor current $I_L$ reflected to the primary maintains the internal diode of Q3 in conduction during the turn on transition at instant $t_d$. As shown in FIG. 9, a positive voltage appears across the output inductor $L_{out}$ which causes the inductor current $I_L$ to increase.

This completes a description of the converter's operation for one half cycle. The operation during the second half cycle is similar. During the time interval between instants $t_e$ and $t_f$ a resonant transition occurs between transistors Q2 and Q1. During the time interval between $t_f$ and $t_g$ all four rectifier transistors are conducting simultaneously. During the time interval between $t_g$ and $t_h$ a resonant transition occurs between transistors Q3 and Q4 returning the circuit to its initial state.

The output voltage of the converter is given by $$V_{out} = \frac{DV_{in}}{n}$$

where D is the effective switch duty ratio and n is the turns ratio of the power transformer. Since ZVRT switching occurs over a finite time interval, a duty ratio of 100 percent is not obtainable. A maximum duty ratio of approximately 92 percent is reasonable, however. As an additional design constraint, it is desirable to fabricate the power transformer with a simple integer turns ratio to minimize leakage inductance.

A disadvantage of ZVRT switching is that conduction losses in the power FETs, transformer windings, and inductor windings are increased due to the increased ripple current that is required. The increased conduction losses, which are independent of switching frequency, that result from a ZVRT switching strategy may be viewed as the penalty that must be paid for the elimination of switching losses. However, for switching frequencies of approximately 100 KHz and above, the overall losses in a switch-mode power converter circuit may be reduced when ZVRT switching is implemented. This is a lower "break even" than is obtained in resonant-switch or full-resonant topologies because ZVRT switching does not increase the "off-state" voltage stress on the power switching transistors.

The conduction losses in full bridge multiple ZVRT converter are inherently lower than in other ZVRT topologies because the secondary-side synchronous rectifier switches may be driven such that the ripple currents are confined to the secondary-side of the converter for a significant portion of each switching cycle. This portion of the switching cycle is the "freewheeling" period which has a duration of 1-D; where D is the effective duty ratio of the converter. Therefore, the total conduction losses on the primary-side of the full bridge converter will be lowered by a factor of D. Furthermore, during the freewheeling period, all four synchronous rectifier switches are turned on simultaneously to further reduce the secondary side conduction losses. The factor $K_{sec}$ by which conduction losses are lowered on the secondary-side of the converter is given by:

$$K_{sec} = 0.5(1+D)$$

During nominal operation the effective duty ratio D in the full bridge converter will be $$D = \frac{nV_{out}}{V_{in}}$$

A representative duty cycle may be 0.50 to 0.60.

During nominal operation at an input voltage, overlapping conduction in the synchronous rectifiers may generally reduce conduction losses by 40-60 percent on the primary side and by 20-30 percent on the secondary side, but this is significant because conduction losses are the major loss mechanism in the power converter.

Figure 10:
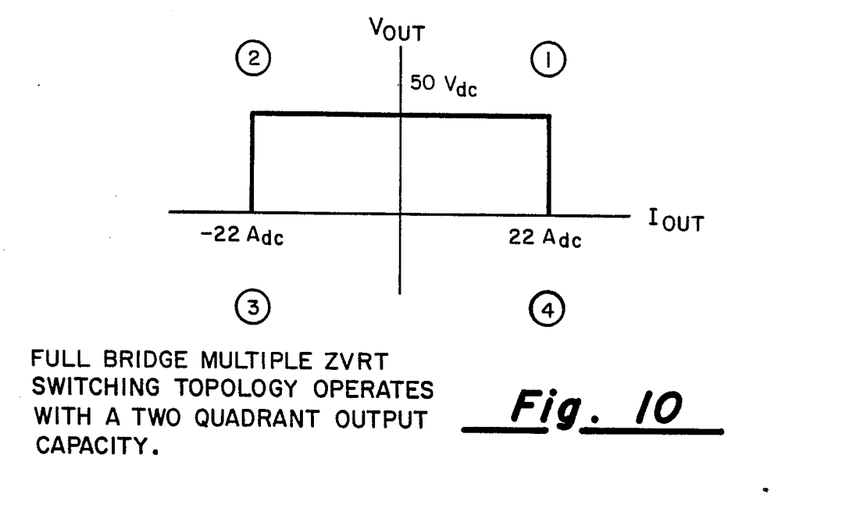
FIG. 10 is a quadrant plane diagram which illustrates the output capacity of the circuit of FIG. 1 assuming a positive polarity output.
Figure 11:
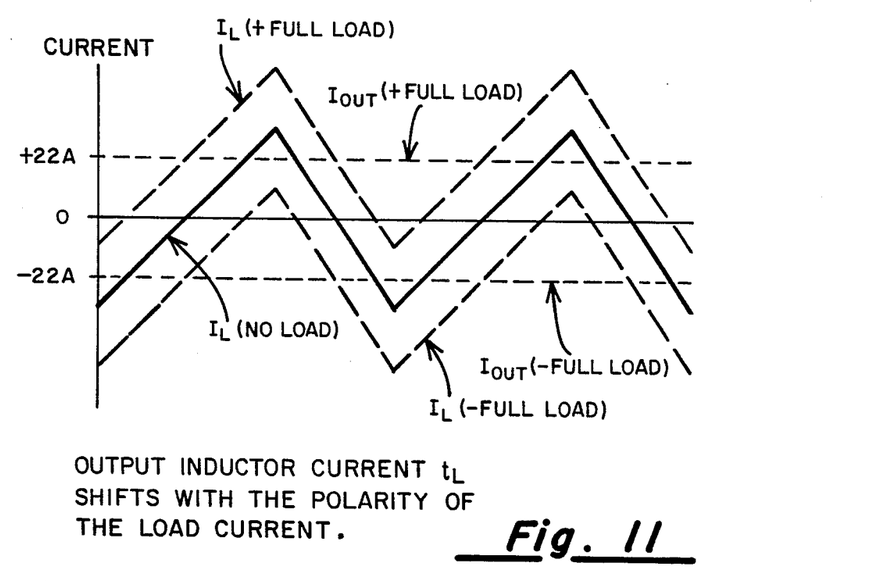
FIG. 11 is a waveform graph that illustrates output inductor current shifts with the polarity of the load current.

A unique feature of the full bridge multiple ZVRT switching topology of the present invention is that the converter inherently operates with a two quadrant output capability, as shown in FIG. 10. In quadrant 1, the output current of the converter is positive so that power is delivered to the load. This is the normal operating mode of all power converters. In quadrant 2, the output current is negative so that power is actually taken from the load. Since an input diode is used, the converter stores the energy in the input filter capacitance rather than returning it to the input power source. The output inductor current $I_L$ shifts with the polarity of the load current, as shown in FIG. 11. As long as the magnitude of the load current is less than a maximum value, the converter will operate with ZVRT switching and the feedback loop will maintain an output voltage on the output bus. This allows loads with inductive characteristics to be powered on the DC voltage distribution bus because the converter will absorb power reflections from the bus while maintaining regulation.

High density energy storage capacitors should be used at the input and in the output filter circuit. The input capacitors are required to reduce conducted noise on the input power lines by supplying the peak pulse current produced by the power switching circuit. They also support the load during absence of input power, providing system hold-up, or operate through time. High density capacitors are also required at the output to reduce the power switching ripple voltage and to provide for load surge currents and the low output impedance necessary for stable operation.

I claim:

1. A full bridge power converter constructed to achieve substantially zero voltage, resonant transition switching comprising first and second input lines for receiving an input voltage; first and second output lines for supplying an output voltage; transformer means comprising an input winding with first and second primary lines and an output winding with first and second secondary lines; first, second, third, fourth, fifth, sixth, seventh and eighth current-switching means, each comprising a current path and a control terminal for controlling the opening and closing said current path, each current-switching means being constructed to provide capacitance across said current path and a diode means that has an anode and a cathode coupled across said capacitance means; output inductance means coupled to one of said output lines for coupling output load current that varies continuously between a first peak of one polarity and a second peak of a polarity opposite to said one polarity thereto; and control means coupled to all of said control terminals for supplying control signals thereto, wherein, said first current-switching means is connected so that its current path is coupled between said first input line and said first primary line such that its diode has its cathode coupled to said first input line and its anode is coupled to said first primary line, said second current-switching means is connected so that its current path is coupled between said first primary line and said second input line such that its diode has its cathode coupled to said first primary line and its anode is coupled to said second input line, said third current-switching means is connected so that its current path is coupled between said first input line and said second primary line such that its diode has its cathode coupled to said first input line and its anode is coupled to said second primary line, said fourth current-switching means is connected so that its current path is coupled between said second primary line and said second input line such that its diode has its cathode coupled to said second primary line and its anode is coupled to said second input line, said fifth current-switching means is connected so that its current path is coupled between said first output line and said first secondary line such that its diode has its cathode coupled to said first secondary line and its anode is coupled to said first secondary line, said sixth current-switching means is connected so that its current path is coupled between said first secondary line and said second output line such that its cathode is coupled to said first secondary line and its anode is coupled to said second output line, said seventh current-switching means is connected so that its current path is coupled between said first output line and said second secondary line such that its cathode is coupled to said first output line and its anode is coupled to said second secondary line, said eighth current-switching means is connected so that its current path is coupled between said second secondary line and said second output line such that its cathode is coupled to said second secondary line and its anode is coupled to said second output line, said input voltage comprises repetitive cyclic pattern of tri-level pulses in which said tri-level pulses comprise first, second and third levels of voltage that are controlled such that said second level is intermediate said first and third levels and each cycle of said pattern of said tri-level pulses follows the sequence of a first level of voltage, a second level of voltage, a third level of voltage and a second level of voltage, and wherein said control means supplies control pulses to said control terminals of said current-switching means for controlling said current-switching means for each cycle of said pattern of said pulses so that when:

said input voltage is at an initial first level during a cycle said current paths of said first, fourth, fifth and eighth current-switching means are closed and said current paths of all of said other current-switching means are open, and when, said input voltage goes to said second level during a cycle, said current paths of said second, fourth, fifth, sixth, seventh and eighth current-switching means are closed and all of said other current-switching means are open, wherein said current path of said first current-switching means is switched and open when said output current reaches said first peak before said current paths of said second, sixth and seventh current-switching means are switched closed, and when said input voltage goes to said third level during a cycle, said current paths of said second, third, sixth and seventh current-switching means are closed, and all of said other current-switching means are open, wherein said current path of said second current-switching means is switched open when said output current reaches said first peak before said current paths of said first, fifth and eighth current switching means are switched closed, and when said input voltage goes again to said second level during a cycle, said current paths of said first, third, fifth, sixth, seventh and eighth current-switching means are closed and all of said other current-switching means are open, and when said input voltage goes back to said initial first level to complete an input voltage cycle said current paths of said third, sixth and seventh current-switching means are switched open when said output current reaches said second peak before said fourth switching means is switched closed.

2. A full bridge power converter as claimed in claim 1 wherein said first input voltage level is of one polarity, said second voltage level is substantially a zero voltage level, and said third voltage level is of the opposite polarity to said one polarity and is of a substantially equal magnitude.

* * * * *